United States Patent
Ishioka et al.

(10) Patent No.: US 6,855,407 B2
(45) Date of Patent: Feb. 15, 2005

(54) ELECTRICALLY CONDUCTIVE RESIN COMPOSITION

(75) Inventors: Katsutoshi Ishioka, Fukushima (JP); Shigeru Watanabe, Fukushima (JP); Takaaki Yasudomi, Fukushima (JP)

(73) Assignee: NOK Corporation, Tokyo (JP)

( * ) Notice: Subject to any disclaimer, the term of this patent is extended or adjusted under 35 U.S.C. 154(b) by 218 days.

(21) Appl. No.: 10/221,121

(22) Filed: Sep. 6, 2002

(65) Prior Publication Data

US 2003/0038279 A1 Feb. 27, 2003

(30) Foreign Application Priority Data

| May 10, 2000 | (JP) | 2000-137062 |
| Sep. 20, 2000 | (JP) | 2000-284464 |
| Mar. 9, 2001 | (JP) | 2001-066944 |

(51) Int. Cl.$^7$ .................................................. D04H 5/00
(52) U.S. Cl. ................... 428/292.1; 428/293.1; 428/323; 428/328; 428/333; 428/367; 428/372; 264/241; 264/294; 264/299; 264/345
(58) Field of Search .............................. 428/292.1, 148, 428/174, 175, 212, 213, 220, 293.1, 323, 328, 333, 359, 364, 367, 372; 264/241, 259, 294, 299, 345

(56) References Cited

FOREIGN PATENT DOCUMENTS

| EP | 0 117 700 A1 | | 9/1984 |
| JP | 60-092354 | | 5/1985 |
| JP | 62-280240 | * | 5/1987 |
| JP | 62-280240 | | 12/1987 |
| JP | 01-101373 | | 4/1989 |
| JP | 04-168147 | | 6/1992 |
| JP | 07-011466 | | 1/1995 |
| JP | 2000-234055 | | 8/2000 |
| JP | 2000-239488 | | 9/2000 |

* cited by examiner

*Primary Examiner*—Merrick Dixon
(74) *Attorney, Agent, or Firm*—Butzel Long

(57) ABSTRACT

An electroconductive resin composition, which comprises a thermosetting resin as a matrix and 40 to 90% by weight, on the basis of the composition, of carbon fibers and graphite as fillers, has a high electroconductivity and is suitable for use as a molding material for fuel cell separators. By using a molding material comprising phenol resin as a matrix and at least one kind of carbon fibers and graphite being coated by an electroconductive metal and molding fuel cell separators from the molding material, followed by post-curing at 130 to 300° C., fuel cell separators with a stable power generation capacity can be obtained.

5 Claims, No Drawings

ELECTRICALLY CONDUCTIVE RESIN COMPOSITION

TECHNICAL FIELD

The present invention relates to an electroconductive resin composition, and more particularly to an electroconductive resin composition suitable for use as a molding material for fuel cell separators.

BACKGROUND ART

As to fuel cell separators, two major groups, i.e. metallic separators and carbon separators, are now under study.

Noble metals such as gold, etc. are desirable for the metallic separators from the viewpoint of electrochemical stability, but are very expensive and thus are not yet practicable. Other metals, such as iron, etc. have a problem of electrochemical corrosion, requiring surface coating with a noble metal, and thus still have such a disadvantage as processwise high cost.

Carbon separators, on the other hand, are electrochemically stable. Graphite substrates are prepared by a process of impregnating a thermosetting resin such as phenol resin, furan resin, etc. followed by calcining or by a process of kneading graphite powder with a thermosetting resin, followed by molding into a plate form and successive calcining. The graphite substrates are not only expensive because these processes require a calcining step for carbonization or graphitization to obtain a high electroconductivity, but also post-processing is indispensable for formation of cooling water passages, etc.

DISCLOSURE OF THE INVENTION

An object of the present invention is to provide an electroconductive resin composition with a high electroconductivity and suitable for use as a molding material for fuel cell separators.

The object of the present invention can be attained by an electroconductive resin composition, which comprises a thermosetting resin as a matrix and 40 to 90% by weight, on the basis of the composition, of carbon fibers and graphite as fillers.

Thermosetting resin for use as a matrix in the present invention includes, for example, phenol resin, furan resin, epoxy resin, etc., preferably phenol resin. Any of novolak type resin and resol type resin can be used as phenol resin, where the novolak type resin is preferable. The novolak type phenol resin having a weight average molecular weight of 1,000 to 5,000 is more preferable. Below 1,000, the flowability is so high that there will be such troubles as generation of flashes during the molding step or burn marks due to gas generation. Above 5,000, on the other hand, the flowability is so poor that there will be a molding difficulty in general. About 10 to about 30 parts by weight of hexamethylenetetramine, etc. can be mixed as a curing agent with 100 parts by weight of phenol resin. It is preferable to uniformly mix hexamethylenetetramine, etc. with phenol resin in advance to use.

The thermosetting resin is used in a proportion of 60 to 10% by weight, preferably 50 to 20% by weight, on the basis of the composition. Below 10% by weight, the thermosetting resin will not serve as a matrix resin, considerably deteriorating the moldability, whereas above 60% by weight, desirable electroconductivity will not be obtained.

Carbon fibers for use in the present invention have a ratio of average fiber length L/average fiber diameter D of not less than 2, generally 2 to 1800. Below L/D of 2, not only the desired electroconductivity will not be obtained, but also the strength will be lowered. It is preferable to use carbon fibers coated with an electroconductive metal such as nickel, etc. by plating, where the cross-sections of the fibers may not be metal coated.

Graphite for use in the present invention includes, for example, artificial graphite, flake graphite, vein graphite, natural graphite, expanded graphite prepared by chemical treatment of natural graphite, etc., and has an average particle size of not more than 50 $\mu$m, preferably not more than 20 $\mu$m. When graphite having an average particle size of more than 50 $\mu$m, not only the desired electroconductivity will be hard to obtain, but also the strength will be lowered. Graphite coated with an electro-conductive metal such as nickel, etc. can be also used.

Carbon fibers and graphite can be used each in a proportion of 5 to 85% by weight on the basis of the composition including the thermosetting resin matrix, and 40 to 90% by weight, preferably 50 to 80% by weight in sum total thereof on the basis of the composition including the thermosetting resin matrix. When the proportion of these fillers is less than 40% by weight, the desired electroconductivity will be no more obtained, whereas above 90% by weight a proportion of the thermosetting resin matrix will be too small, so that the moldability will be considerably deteriorated.

Carbon fibers and graphite are essential fillers, but glass fibers, aramid fibers, whisker fibers, polytetrafluoroethylene resin powder, carbon black, minerals, etc. can be also used as other additive fillers, if desired, within such a range as not to impair the object of the present invention. Furthermore, those coated with nickel, or particulate, flake, fibrous or other shaped nickel itself can be also used as a filler. Ordinary additives so far used in the phenol resin, for example, lubricants, etc. can be used, if desired.

The composition can be molded by any molding procedure so far used in molding of thermosetting resins, for example, injection molding, compression molding, transfer molding, etc., and the resulting molded products show an electroconductivity of not more than $10^{-2}$ $\Omega$-cm in terms of volume resistivity (according to JIS K-7194).

Molded products having a high electroconductivity can be produced in a complicated shape by one molding operation as a characteristic of the present invention, but resin-coated metallic thin plates can be also produced by insert molding a metallic thin plate with the present composition, thereby forming a resin coat layer of the present composition thereon.

Metallic thin plates for insert molding include, for example, metallic plates, punched metals, metallic wiremeshes, fiber metal non-woven fabrics, etc, which are not more than 2 mm thick, usually 0.1–0.5 mm thick, and a resin coat layer is formed thereon by insert molding.

The smaller the thickness of the resin coat layer to be formed, the higher the electroconductive effect is obtained. The thickness of the resin coat layer is desirably not more than 3 mm, preferably 0.1–0.5 mm. Smaller thickness of the resin coat layer leads to smaller thickness of the resin-coated metallic thin plates themselves, reducing the plate electric resistance.

The resin-coated metallic thin plates thus formed can be effectively used as full cell separators, making the fuel cells more compact.

When phenol resin, preferably novolak type phenol resin is used as a thermosetting resin and at least one of the carbon fibers and graphite is coated with an electroconductive metal, preferably nickel, fuel cell separators can be molded only from the electroconductive resin composition without insert molding of metallic thin plates.

Separators molded into a desired shape from the electroconductive resin composition is preferably post-cured at 130 to 300° C., preferably 180 to 230° C. for about 3 to about 5 hours, after molding into desired shape. Power generation capacity of the separator plates post-cured below 130° C. will be more and more decreased with increasing the number of repetitions in evaluation of power generation, though their initial power generation capacity is satisfactory. Above 300° C., on the other hand, the phenol resin will undergo thermal decomposition.

The above-mentioned temperatures of the post-curing step are considerably lower than calcining temperatures for carbonization or graphitization of the thermosetting resin of the prior art, and furthermore the post-curing step can be also carried out in the air surroundings. That is, the post-curing step is quite different from the calcining step of thermosetting resin for attaining a higher electroconductivity.

Post-curing in the air surroundings has no problem at all, and thus the post-curing is not restricted to specific surroundings, for example, inert gas surroundings, etc. Post-curing can be carried out not only under application of correction jigs for preventing deformation of molded procucts, but also irrespective of mounting state of molded products without any trouble.

The present electroconductive resin composition has a good moldability and thus can be molded into separators having complicated shape by one molding operation. The successive curing reaction can be completed by post-curing, making MEA (membrane-electrode assembly) of solid polymer type fuel cells harmless and providing chemically stable separator plates at low cost.

BEST MODES FOR CARRYING OUT THE INVENTION

The present invention will be described below, referring to Examples.

EXAMPLES 1 TO 4

Given proportions each of novolak type phenol resin containing 20 wt. % hexamethylenetetramine (a product made by Ohtalite Co., Ltd.), carbon fibers (HTA-C3S, a product made by Toho Rayon Co., Ltd., average fiber length L=3 mm, average fiber diameter D=7 $\mu$m, L/D=429), and graphite (AT-10S, a product made by Oriental Sangyo Co., Ltd., average particle size: 26 $\mu$m) were kneaded together by a kneader (though the amount of the phenol resin was used in terms of a pure product), and the kneaded mixture was compression molded to prepare disc test pieces, 100 mm diameter and 2 mm thick. Volume resistivity thereof was measured according to JIS K-7194.

The results are shown in Table 1 together with the given proportions of the components.

TABLE 1

| | Proportion of components (wt. %) | | | |
|---|---|---|---|---|
| Example No. | Phenol resin | Carbon fibers | Graphite | Volume resistivity ($\Omega$-cm) |
| 1 | 20 | 45 | 35 | $2 \times 10^{-2}$ |
| 2 | 25 | 40 | 35 | $3 \times 10^{-2}$ |
| 3 | 30 | 35 | 35 | $4 \times 10^{-2}$ |
| 4 | 40 | 25 | 35 | $8 \times 10^{-2}$ |

EXAMPLE 5

In Example 3 FM14 (a product made by Petka Co., Ltd., L=18 $\mu$m, D=7 $\mu$m, L/D=2.5) as carbon fibers and AT-20TN (a product made by Oriental Sangyo Co., Ltd., average particle size: 9 $\mu$m) as graphite were used in the same proportions as in Example 3.

EXAMPLE 6

In Example 3, UCF1000-C2.5 (a product made by Mitsui Mining Co., Ltd., L=2.5 mm, D=1.5 $\mu$m, L/D=1670) as carbon fibers and AT-20TN as graphite were used in the same proportions as in Example 3.

EXAMPLE 7

In Example 3, FM14 as carbon fibers and AT-15S (a product made by Oriental Sangyo Co., Ltd., average particle size: 12 $\mu$m) as graphite were used in the same proportions as in Example 3.

Results of measurements in Examples 5 to 7 are shown in the following Table 2.

TABLE 2

| Example No. | Volume resistivity ($\Omega$-cm) |
|---|---|
| 5 | $4 \times 10^{-2}$ |
| 6 | $6 \times 10^{-2}$ |
| 7 | $5 \times 10^{-2}$ |

EXAMPLE 8

In Example 4, the proportion of carbon fibers was changed to 22 wt. %, and 38 wt. % of artificial graphite RAS-12A (a product made by Tyuetsu Graphite Kogyosho Co., Ltd., average particle size: 12 $\mu$m) as graphite was used.

EXAMPLE 9

In Example 8, flake graphite (BF-8A, a product made by Tyuetsu Graphite Kogyosho Co., Ltd., average particle size: 8 $\mu$m) as graphite was used in the same proportion as in Example 8.

EXAMPLE 10

In Example 8, vein graphite (CP-8A, a product made by Tyuetsu Graphite Kogyosho Co., Ltd., average particle size: 8 $\mu$m) as graphite was used in the same proportion as in Example 8.

EXAMPLE 11

In Example 8, expanded graphite (BSF-8A, a product made by Tyuetsu Graphite Kogyosho Co., Ltd., average particle size: 8 $\mu$m) as graphite was used in the same proportion as in Example 8.

EXAMPLE 12

35 wt. % of novolak type phenol resin containing 20 wt. % of hexamethylenetramine (a product made by Ohtalite Co., Ltd.), 30 wt. % of nickel-plated PAN process carbon fibers (Besfite MC, a product made by Toho Rayon Co., Ltd., average fiber length L=3 mm, average fiber diameter D=7.5 μm, L/D=400, fiber cut cross-sections had no nickel plating), and 35 wt. % of artificial graphite (RAS-12A, a product made by Tyuetsu Graphite Kogyosho Co., Ltd., average particle size: 12 μm) were kneaded together and compression molded in the same manner as in Example 1 to prepare test pieces.

Results of measurement in Examples 8 to 12 are shown in the following Table 3.

TABLE 3

| Example No. | Volume resistivity (Ω-cm) |
| --- | --- |
| 8 | $6 \times 10^{-2}$ |
| 9 | $5 \times 10^{-2}$ |
| 10 | $4 \times 10^{-2}$ |
| 11 | $4 \times 10^{-2}$ |
| 12 | $5 \times 10^{-3}$ |

COMPARATIVE EXAMPLE 1

40 wt. % of novolak type phenol resin containing 20 wt. % of hexamethylenetramine (a product made by Ohtalite Co., Ltd.) and 60 wt. % of glass fibers (chopped strands CS03MB498A, a product made by Asahi Fiber Glass Co., Ltd.) were subjected to roll kneading, compression molding and measurement. The resulting disc test pieces had a volume resistivity of $10^7$ Ω-cm or more.

EXAMPLES 13 AND 14

A SUS 304 wiremesh having about 0.1 mm in thickness, 120 meshes, 91 μm in wire diameter and 121 μm in clearances was placed into a lower mold of a compression press, and the kneaded product of Example 7 was uniformly spread thereon, followed by compression molding. Then, wiremeshes having a resin coat layer, 0.2 mm in layer thickness (Example 13) or 15 mm in layer thickness (Example 14) were subjected to punching to obtain disc test pieces, 150 mm in diameter. Volume resistivity of the test pieces was measured.

COMPARATIVE EXAMPLES 2 AND 3

In Examples 13 and 14, the kneaded product of Comparative Example 1 was used in place of the kneaded product of Example 7.

Results of measurement in the foregoing Examples 13 and 14 and Comparative Examples 2 and 3 are shown in the following Table 4.

TABLE 4

| Example | Coat layer thickness (mm) | Volume resistivity (Ω-cm) |
| --- | --- | --- |
| Example 13 | 0.2 | $5 \times 10^{-3}$ |
| Example 14 | 1.5 | $1 \times 10^{-2}$ |
| Comp. Ex. 2 | 0.2 | $>10^7$ |
| Comp. Ex. 3 | 1.5 | $>10^7$ |

EXAMPLE 15

The electroconductive resin composition used in Example 12 was compression molded into a fuel cell separator with 1.8 mm-deep fuel gas passage grooves, followed by post-curing at 230° C. for 3 hours.

The separator was mounted on a PEMFC type fuel cell test apparatus (available from Electrochem Co., Ltd.; single cell: electrode area of 50 cm$^2$) and subjected to repeated power generation capacity test (output at 0.5V). Reference Example shows measurements of carbon separator originally mounted on the test apparatus. Comparative Example 4 shows measurements of the fuel cell separator of this Example, obtained by post-curing at 120° C. for 3 hours.

Measurement Conditions
 Cell temperature: 65° C.
 Anode flow rate: 700 ml/min.
 Cathode flow rate: 700 ml/min.
 Anode pressure: 0.3 MPa
 Cathode pressure: 0.3 MPa

| The number of repetition | Example 15 (W) | Reference Ex. (W) | Comp. Ex. 4 (W) |
| --- | --- | --- | --- |
| 1 | 6.7 | 4.9 | 5.6 |
| 2 | 5.7 | 5.0 | 5.3 |
| 3 | 5.6 | 5.4 | 4.8 |
| 4 | 5.6 | 5.9 | 4.6 |
| 5 | 5.7 | 5.9 | 4.3 |
| 6 | 6.6 | 7.7 | 4.1 |
| 7 | 6.3 | 6.9 | 3.9 |
| 8 | 6.2 | 5.9 | 3.8 |
| 9 | 6.3 | 5.1 | — |

The following can be concluded from the foregoing results.

(1) The fuel cell separator molded from the present electroconductive resin composition is equivalent in power generation capacity to the carbon separator, but is superior in the stability in the repeated power generation capacity test to the carbon separator.

(2) In case of Comparative Example 4, the power generation capacity is gradually lowered with increasing the number of repetition test.

(3) Grooves in the carbon separator was subjected to cutting processing, so that the groove angles were in an edge configuration. In Example 15, an attempt was made to provide groove angles in an edge configuration for comparison with the carbon separator by the processing, but owing to the good moldability per se of the present electroconductive resin composition, the groove angles could be molded not into the edge configuration, but in a curved configuration.

Industrial Applicability

It has been desirable from the viewpoint of processability and cost that electroconductive materials can be produced simply from resin molding materials, but there have been a limit to the electroconductivity of the electroconductive materials produced simply from the resin molding materials. However, the present electroconductive resin composition has not only a distinguished processability such as attainment of a satisfactory processability by one molding operation, but also can produce highly electroconductive molded products having complicated shapes. Metallic thin plates in combination with resin coat layers formed from the present electroconductive resin composition thereon by insert molding are so compact that they can be used as effective fuel cell separators.

Particularly, when at least one of carbon fibers and graphite is coated with a electrochemically stable nickel metal, fuel cell separators with a stable power generation capacity can be molded only from the electroconductive resin composition without any insert molding of metallic thin plates.

What is claimed is:

1. A resin-coated metallic thin plate for a fuel cell, which comprises a metallic thin plate and a resin coat layer of an electroconductive resin composition comprising a thermosetting resin as a matrix and 40 to 90% by weight, on the basis of the composition, of carbon fibers and graphite as fillers, formed by insert moldings.

2. A resin-coated metallic thin plate according to claim 1, wherein the metallic thin plate is a metallic plate, punched metal or metallic wiremesh.

3. A resin-coated metallic thin plate according to claim 1, wherein the resin coat layer has a thickness of not more than 3 mm.

4. A process for producing a fuel cell separator, which comprises molding a fuel cell separator from an electroconductive resin composition comprising phenol resin as a matrix and 40 to 90% by weight, on the basis of the composition, of carbon fibers and graphite fillers, where at least one kind of the carbon and graphite is coated with an electroconductive metal, as a molding material, followed by post-curing at 130 to 300° C.

5. A process according to claim 4, wherein the electroconductive metal is nickel.

* * * * *